United States Patent [19]

Straslicka

[11] 4,219,201
[45] Aug. 26, 1980

[54] SEALING ASSEMBLY
[75] Inventor: William A. Straslicka, Norvelt, Pa.
[73] Assignee: Carrier Corporation, Syracuse, N.Y.
[21] Appl. No.: 909,132
[22] Filed: May 24, 1978
[51] Int. Cl.² .......................................... F16U 15/44
[52] U.S. Cl. ..................................... 277/53; 277/70;
                                      277/236; 417/55; 417/70
[58] Field of Search ................... 277/29, 70, 236, 53,
                                           277/56; 417/70, 55

[56]          References Cited
         U.S. PATENT DOCUMENTS

| 2,678,838 | 5/1954  | Richardson | 277/70  |
| 2,740,647 | 4/1956  | Van Pelt   | 277/56  |
| 3,472,518 | 10/1969 | Harlan     | 277/53  |
| 3,477,385 | 11/1969 | Tangeman   | 277/56  |
| 3,501,089 | 3/1970  | Alford     | 277/53  |
| 3,630,529 | 12/1971 | Ball       | 277/56  |
| 3,927,889 | 12/1975 | Adams      | 277/29  |
| 4,089,535 | 5/1978  | Sattinger  | 277/236 |

Primary Examiner—Robert I. Smith
Attorney, Agent, or Firm—Donald F. Daley; John S. Sensny

[57]            ABSTRACT

An assembly for sealing an interface between a high pressure steam chest or chamber and a casing, wherein high pressure steam flows from the steam chest into the interior of the casing. The assembly comprises a sealing element extending through the interface for preventing direct contact between the high pressure steam and the interface, and joined to the steam chest so that a steam tight joint is developed therebetween. The assembly further comprises an auxiliary chamber defined by the steam chest, the casing, and the sealing element in communication with the interface between the steam chest and the casing; a first passageway having one end in communication with the interior of the casing and a second end in communication with the auxiliary chamber, for passing steam from the interior of the casing to the auxiliary chamber; and means for developing a pressure differential across the first passageway so that the steam pressure at the second end of the passageway is less than the steam pressure at the first end of the passageway. A low pressure region is provided having a steam pressure lower than the steam pressure in the steam chest; and a second passageway is provided, having one end in communication with the auxiliary chamber and a second end in communication with the low pressure region for passing steam from the auxiliary chamber to the low pressure region.

5 Claims, 3 Drawing Figures

4,219,201

SEALING ASSEMBLY

BACKGROUND OF THE INVENTION

This invention relates generally to sealing methods and assemblies, and more specifically to a assembly and method for sealing the interface between a high pressure steam chest and a steam turbine casing.

A steam turbine includes, generally, a steam chest where high pressure steam is collected and a turbine casing wherein the energy contained within the steam is utilized to rotate a power shaft. Typically, the steam chest is placed on the top surface of the turbine casing, forming an interface between the steam chest and the casing. The top surface of the casing defines a plurality of apertures through which steam flows from the chest into the casing. A valve and a valve seat are positioned in each aperture and the valves are regulated to control the amount of steam passing from the steam chest into the turbine casing, thereby controlling the capacity of the steam turbine.

As a general rule, the efficiency of the turbine increases as the pressure of the steam increases. However, when high pressure steam, for example steam in the area of 1500 pounds per square inch, is used with a steam turbine, interfaces such as the one between the steam chest and the turbine casing subject to such pressures become extremely difficult to seal. The success of such a seal depends on many factors such as mating surface finishes, adequate bolting, temperature gradient, proper seal design, and assembly procedures. Many man hours are usually lost before a sufficiently tight seal is achieved at the interface.

SUMMARY OF THE INVENTION

In view of the above, an object of the present invention is to improve steam turbines.

Another object of the invention is to improve the seal at the interface between the steam chest and the turbine casing of a steam turbine.

A further object of this invention is to provide a sealing assembly that effectively reduces the pressure felt by the interface between a high pressure steam chest and the turbine casing of a steam turbine.

These and other objectives are attained with an assembly for sealing an interface between a high pressure steam chest or chamber and a turbine casing wherein high pressure steam flows from the steam chest into the interior of the casing. The assembly comprises a sealing element extending through the interface for preventing direct contact between the high pressure steam and the interface and joined to the steam chest so that a steam tight joint is developed therebetween. The assembly further comprises an auxiliary chamber defined by the steam chest, the casing, and the sealing element in communication with the interface between the steam chest and the casing; a first passageway, having one end in communication with the interior of the casing and a second end in communication with the auxiliary chamber, for passing steam from the interior of the casing to the auxiliary chamber; and means for developing a pressure differential across the first passageway so that the steam pressure at the second end of the passageway is less than the steam pressure at the first end of the passageway. A low pressure region is provided, having a steam pressure lower than the steam pressure in the steam chest; and a second passageway is provided, having one end in communication with the auxiliary chamber and a second end in communication with the low pressure region for passing steam from the auxiliary chamber to the low pressure region.

DETAILED DESCRIPTION OF THE PREFERRED EMBODIMENT

Figure 1:
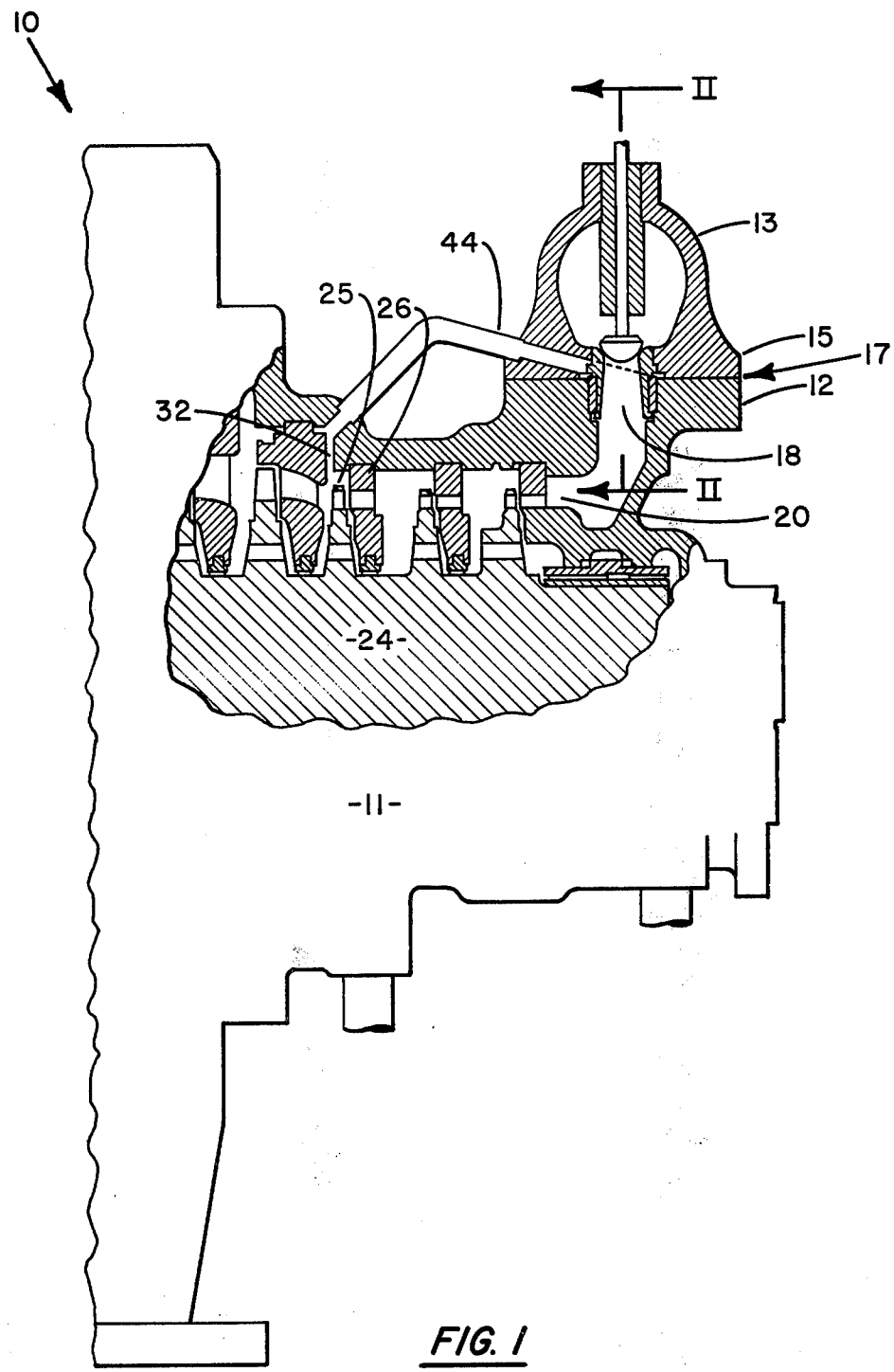
FIG. 1 is a fragmentary view partially in section of a steam turbine equipped with the arrangement serving as the subject of this invention.
Figure 2:
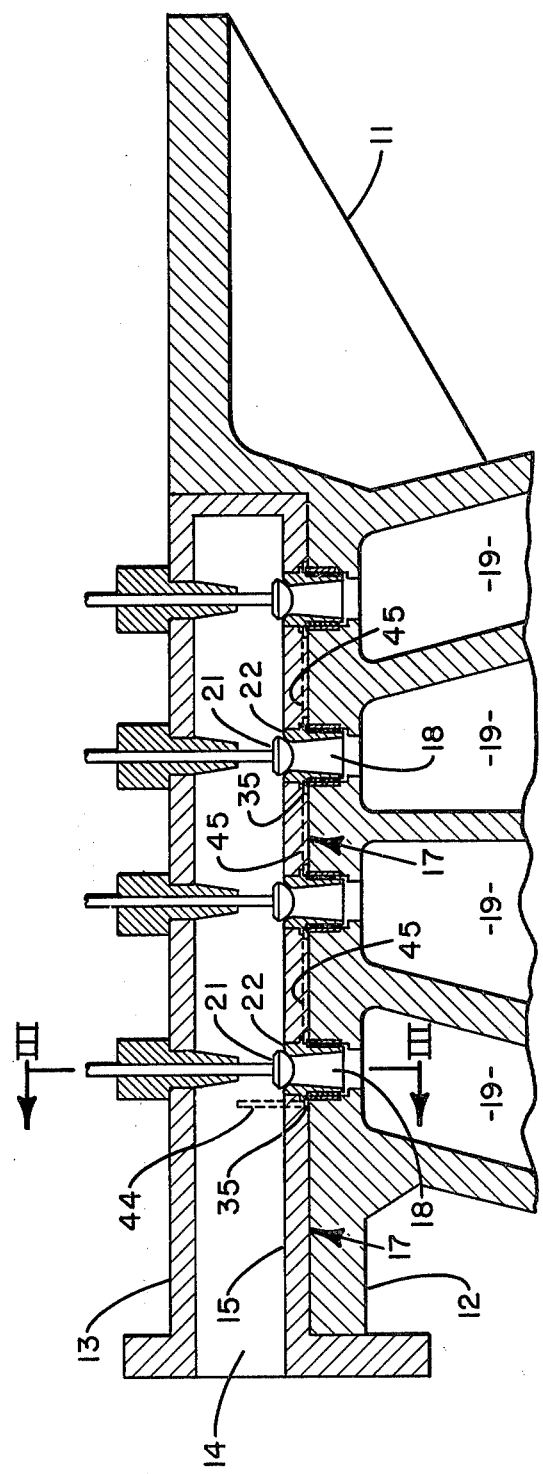
FIG. 2 is a vertical sectional view of the steam chest and contiguous portions of the turbine casing structure of the steam turbine shown in FIG. 1 taken on line II—II of FIG. 1.

Referring to the drawings, a steam turbine is indicated at 10. Turbine 10 includes a turbine casing 11 having a top wall 12, and a fluid chamber such as steam chest 13 having a steam inlet 14 (shown only in FIG. 2) and a bottom wall 15. Top wall 12 of casing 11 and bottom wall 15 of steam chest 13 are joined together by screws 16 (shown only in FIG. 3). These walls define an interface 17 and a series of apertures 18. Apertures 18 extend through interface 17 and communicate with passages 19, which lead to a turbine inlet nozzle section 20. Each aperture has a valve 21 and a valve seat 22 mounted therein. Generally, a valve governing mechanism (not shown in the drawings) is provided for controlling the number of valves 21 which are open at any given time. The number of valves 21 which are open determines the amount of steam flowing through apertures 18, controlling the capacity of turbine 10. The steam tubine 10 also includes an annular passage extending axially of the turbine. Arranged in conventional fashion within the annular passage is a rotatable shaft 24 having a plurality of spaced rotor blades 25 mounted about the outer surface thereof. A plurality of stator blades 26 are secured to turbine casing 11 and are interposed between rotor blades 25.

In operation, high pressure steam is introduced into steam chamber or chest 13 through inlet 14. The steam collects in steam chest 13 and passes through apertures 18, passages 19, and through inlet nozzle 20. The steam then flows through the annular passage which extends axially of casing 11, past the various stages of blading located therein. As the steam flows past rotor blades 25 and stator blades 26, the steam causes rotation of the rotor blades and shaft 24. The rotation of turbine shaft 24 is accomplished by extracting kinetic energy from the steam, resulting in a lowering of the temperature and pressure of the steam. Thus, as the steam passes successively through the stages of blading located in the casing 11, the pressure at each stage is less than the pressure at the previous stage.

Heretofore, great difficulty has been encountered preventing the escape of high pressure steam, for example steam at a pressure of 1500 pounds per square inch or more, through the interface 17 between steam chest 13 and turbine casing 11. Interfaces subject to such high pressure are extremely difficult to seal, and often a significant amount of labor and other expenses are incurred before an adequate seal is obtained. The novel sealing assembly of the present invention, shown in detail in FIG. 3, overcomes many of the difficulties previously encountered. Although one sealing assembly will be described below in detail, it should be understood that the turbine 10 depicted in the drawings has a plurality of such seals; one associated with each aperture 18.

Figure 3:
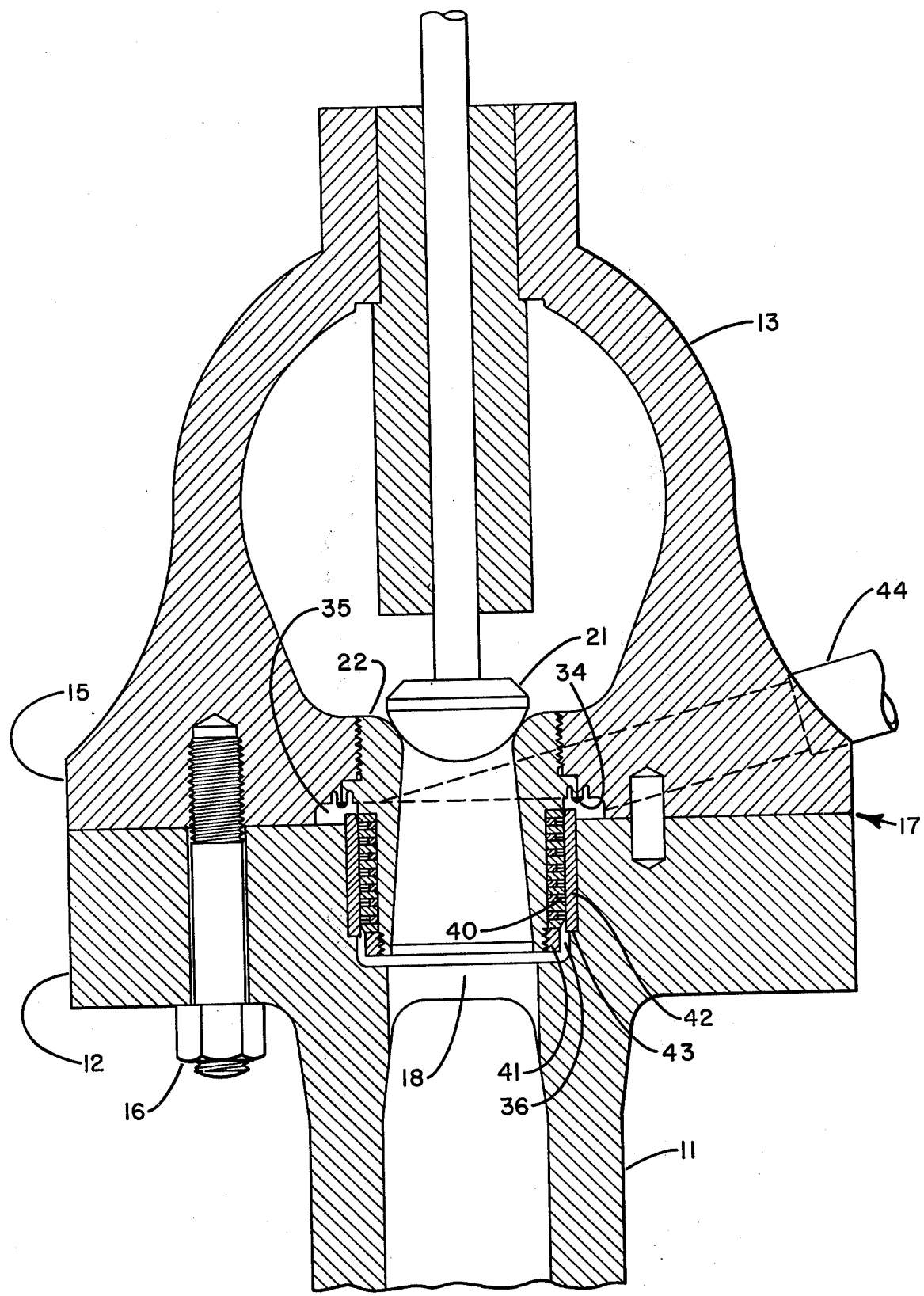
FIG. 3 is an enlarged sectional view taken on line III—III of FIG. 2.

Referring to FIG. 3, valve seat 22 extends through interface 17 formed by bottom wall 15 of steam chest 13 and top wall 12 of turbine casing 11. In this manner, valve seat 22 acts as a sealing element to prevent direct contact between the high pressure steam and interface 17. Valve seat 22 is secured to steam chest 13 by buttress threads or the like. Buttress threads are preferred since they allow for thermal expansion between steam chest 13 and valve seat 22. Also, valve seat 22 and steam chest 13 are joined by means of a welding seal 34 or the like so that a steam tight joint is developed therebetween. Bottom wall 15 of steam chest 13, top wall 12 of turbine casing 11, and valve seat 22 define auxiliary chamber 35 in communication with interface 17 between the steam chest and the turbine casing. In a preferred mode, auxiliary chamber 35 is an annular chamber encircling aperture 18 and valve seat 22. Steam can flow from the interior of turbine casing 11 to auxiliary chamber 35 through a first passageway 36, which is defined by the turbine casing and valve seat 22 and which has one end in communication with the interior of the casing and a second end in communication with the auxiliary chamber.

A plurality of mechanical seals 40 are positioned in first passageway 36, forming a labyrinth passageway. Labyrinth passageways restrict the flow of steam passing therethrough, and are well known in the art as means for developing a pressure differential across a passageway. By locating such means within first passageway 36, steam pressure at the second end of the passageway is less than the steam pressure at the first end of the passageway. The individual seals 40 that comprise the labyrinth passageway are supported by a collar 41 which is fitted around the lower part of valve seat 22. Preferably, retaining means such as sleeve 42 is provided for preventing displacement of mechanical seals 40. Sleeve 42 is located in first passageway 36, is supported by a small shoulder 43 defined by turbine casing 11, and encircles both valve seat 42 and mechanical seals 40 to maintain the mechanical seals in a desired alignment. Further, to facilitate placement of mechanical seals 40 and sleeve 42, an upper edge of the sleeve and the lower edge of the mechanical seal which is at the bottom of the labyrinth passageway are both chamfered.

A second steam passageway 44 connects auxiliary chamber 35 with a low pressure region 32 defined by the turbine casing 11, the shaft 24, and intermediate stages of rotor blades 25 and stator blades 26. Low pressure region 32 is located in an intermediate area of the axially extending annular passage of turbine casing 11 so that the pressure of steam in region 32 is less than the steam pressure in steam chest 13. It should be understood, though, that the sealing assembly of the present invention is not limited to use with a low pressure region located within turbine 10, but may be used with any such relatively low pressure region. Second passageway 44 has one end in communication with auxiliary chamber 35 and a second end in communication with low pressure region 32, and allows steam to flow from the auxiliary chamber to the low pressure region. A third passageway 45 communicating with each auxiliary chamber 35 is provided so that steam can flow between the chambers, and preferably two such passageways are provided, one on either side of the longitudinal centerline of steam chest 13. This arrangement permits a single second passageway 44 to connect all of the auxiliary chambers 35 with low pressure region 32.

In this manner, steam pressure does not build in auxiliary chamber 35, and the steam pressure in the auxiliary chambers is less than that of the high pressure steam in steam chest 13 and turbine casing 11. This lower pressure in auxiliary chambers 35 is the pressure felt by the interface 17 between steam chest 13 and turbine casing 11. Thus, the unique sealing arrangement of applicant's invention effectively reduces the pressure felt at interface 17 from that which is present in steam chest 13 to that which is present in auxiliary chambers 35. The mating surfaces between steam chest 13 and turbine casing 11 see only the reduced pressure of the steam in auxiliary chambers 35. Such a lower pressure interface is much simpler to tightly seal by means of a conventional metal seal than a higher pressure connection. Accordingly, by use of the present invention, the interface between a high pressure steam chest and a steam turbine casing can be effectively sealed in a very simple and economical manner.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A combination fluid chamber and casing comprising:
   means defining a bottom surface of the fluid chamber;
   means defining a top surface of the casing adjacent to the bottom surface of the fluid chamber, the bottom surface of the fluid chamber and the top surface of the casing defining an interface;
   means defining a fluid aperture extending through the interface for transmitting a fluid from the fluid chamber into the casing;
   a sealing element positioned within the fluid aperture and extending through the interface for preventing direct contact between the fluid and the interface;
   means connecting the sealing element with the fluid chamber for forming a fluid tight joint therebetween;
   means defining an auxiliary chamber in communication with the interface;
   means defining a first passageway for passing fluid from the casing into the auxiliary chamber;
   means for reducing the pressure of fluid passing through the first passageway for developing a pressure in the auxiliary chamber less than the pressure in the casing; and
   means defining a second passageway for transmitting fluid from the auxiliary chamber to a low pressure region for maintaining the pressure in the auxiliary chamber less than the pressure in the casing.

2. The invention as defined by claim 1 wherein:
   the auxiliary chamber defining means includes the bottom surface of the fluid chamber, the top surface of the casing, and an outside surface of the sealing element; and
   the first passageway defining means includes an inside surface of the casing and the outside surface of the sealing element.

3. The invention as defined by claim 2 wherein the pressure reducing means includes:

a plurality of mechanical seals arranged to form a labyrinth passageway; and retaining means for maintaining the mechanical seals in a desired alignment.

4. The invention as defined by claim 3 further including:

a collar fitted around the sealing element to support the mechanical seals; and means defining a shoulder to support the retaining means.

5. The invention as defined by claim 4 wherein the auxiliary chamber encircles the sealing element.

* * * * *